UNITED STATES PATENT OFFICE.

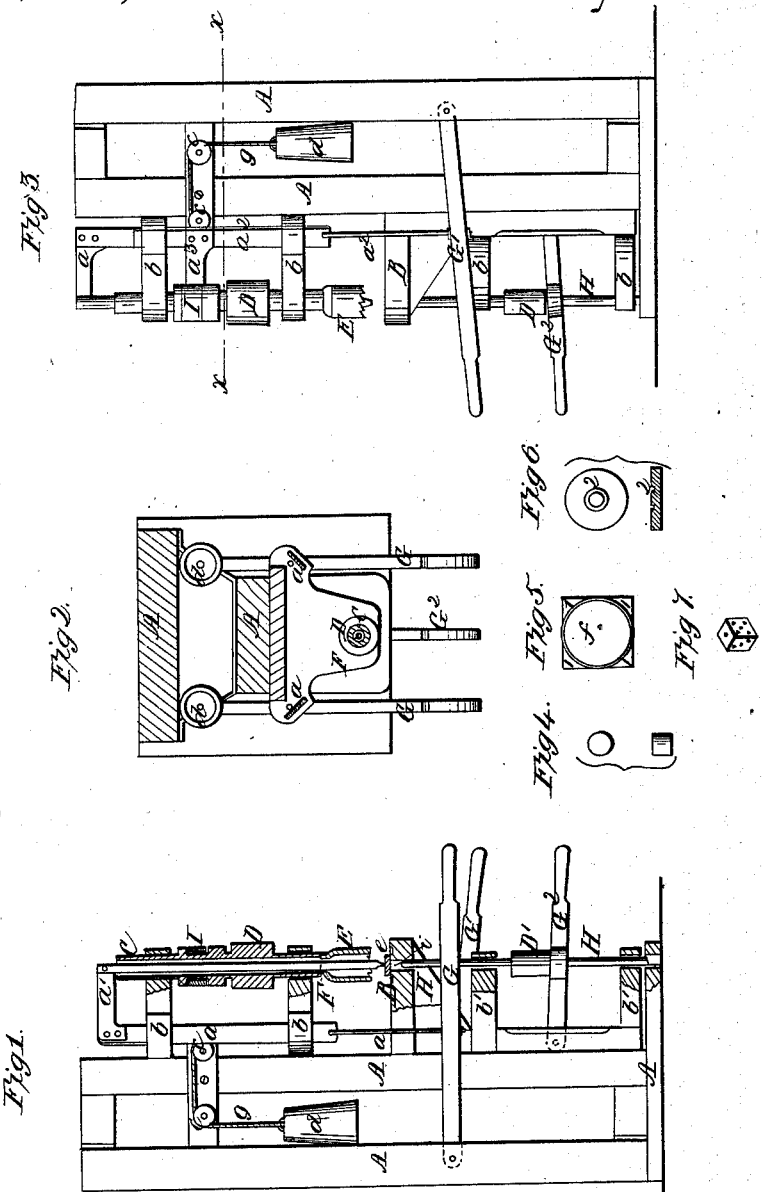

CALVIN B. ROGERS, OF DEEP RIVER, CONNECTICUT.

IMPROVEMENT IN MACHINES FOR CUTTING IVORY.

Specification forming part of Letters Patent No. 47,572, dated May 2, 1865.

*To all whom it may concern:*

Be it known that I, CALVIN B. ROGERS, of Deep River, in the county of Middlesex and State of Connecticut, have invented a new and useful Improvement in Machines for Cutting Ivory; and I do hereby declare that the following is a full, clear, and exact description thereof, which will enable others skilled in the art to make and use the same, reference being had to the accompanying drawings, forming a part of this specification, in which—

Figure 1 is a side view of a machine made according to my invention, drawn from the left-hand side. Fig. 2 is a plan view taken on the line $x$ of Fig. 2. Fig. 3 is a right-hand side view of the machine. Figs. 4, 5, 6, and 7 are different representations of pieces of work done upon the machine.

Similar letters of reference indicate like parts.

This invention consists in various improvements in machines for cutting ivory, bone, and similar substances, which enable the workman to cut out his work with perfect edges and with great facility.

A designates the frame and platform which sustain the mechanism.

B is a table fixed to the frame for sustaining the ivory or other blank. Above the platform B are brackets $b\ b$, through which the hollow arbor C of the cutter E passes, and by which it is guided.

D is a driving-pulley formed on the arbor. The platform B has a groove, $e$, sunk in it vertically beneath the cutter, which is shown in this example to be circular, and therefore the groove $e$ is circular and of such a size as to receive the cutter when it has finished its cut through the ivory or other material operated upon.

F is a rod, which passes within and through the arbor C and cutter E. It is made flat in cross-section at its lower end, or of any other suitable form, with the object of providing the means of holding the stuff to be cut, and of effecting this without interfering with the cutter. The rod F extends above the hollow arbor, and its upper end is made fast to the horizontal part $a'$ of an arm, $a$, whose vertical part extends downward through the brackets $b\ b$, which guide it in its vertical movements to a hand lever, G, of the second order, whose handle extends past the platform B toward the left hand of the workman, and whose fulcrum is a pin in the frame A. On the right hand of the machine is a lever, G', of the same kind, which carries an arm, $a^2$, also guided by the brackets $b\ b$, and whose horizontal arm $a^3$ carries a collar, I, which spans a groove made on the hollow shaft C above the pulley D. Below the platform B, I place brackets $b'\ b'$, which serve as guides for the vertical shaft H' of a cutter, H, which reaches the under side of the stuff to be operated upon through an opening, $i$, in the platform B. This shaft H' carries a pulley, D', and it is made to move in vertical directions by means of a hand-lever, $G^2$. Each of the levers G G' is brought back to its first position by means of a weight, $d$, and a rope, $g$, the latter passing over pulleys $c\ c$.

In machines heretofore used for cutting ivory and bone it has not been possible to cut the work with clean smooth edges, because the stuff is held at points outside of the cutter, and when the kerf is almost finished the parts divide or separate before the cutting-instrument has completed its work, thereby leaving a burr along the edges where the cut is made. This burr must be afterward removed by a different operation. By my invention I overcome this difficulty. By placing the stuff to be cut on the bed B and pressing the lever G downward the stuff will be held to its place by the lower end of the rod F within the cutter. On pressing the lever G' downward the cutter will be brought down upon the stuff and will cut a piece thereout to the shape of the cutter, which must be made to revolve by means of a band around the pulley D. One of the advantages which attends this mode of operation is that pieces can be cut which cannot be held from the outside, and the piece to cut out is held in place on the bed until the cutter passes entirely through the stuff and into the groove $e$, leaving the piece cut out with a smooth edge throughout, having no burrs or breaks on the lower edge. (See Figs. 4 and 5, where work completed and work incomplete are shown.) My improvement enables me to remove the fragments or corners 1, Fig. 5, without leaving any burrs, and I am enabled to save much stuff which is now lost because it is not possible to use pieces of stuff like that seen in Fig. 5 by the machine now in use.

The rod F and its face may be of any proper size and form, and the cutter may be of any form, the cutter I have shown being only intended for an example of a cutter which may be used in this kind of work. The cutter H on the lower shaft is intended for marking, drilling, or centering the work held on the bed above. It may be of any desired shape. It is revolved by means of a belt around its pulley D′. While it is revolving it is brought up through the bed B against the under side of the work, and made to drill, mark, or center it without moving the work from the machine. This device and mode of operation are of great value in drilling holes on the surface of dominoes and dice, as seen in Fig. 7. The cutter H may be of any form, and annular grooves, like that shown in Fig. 6, may be made by its means, or any other figure which can be effected by a rotating cutter.

Having thus described my invention, I claim as new and desire to secure by Letters Patent—

1. The cutter H, operated from below the bed upon the under side of the work while it is held upon the bed, substantially as above described.

2. The combination, in machines for cutting ivory and other substances, of a holding-rod, applied within the kerf of the cutter, with a cutter which divides the work from the stuff, and with a drill or centering or marking cutter operated from below the work, substantially as described.

CALVIN B. ROGERS.

Witnesses:
M. M. LIVINGSTON,
C. L. TOPLIFF.